May 12, 1936. C. O. BALL ET AL 2,040,726
METHOD AND APPARATUS FOR CANNING
Filed Aug. 16, 1932
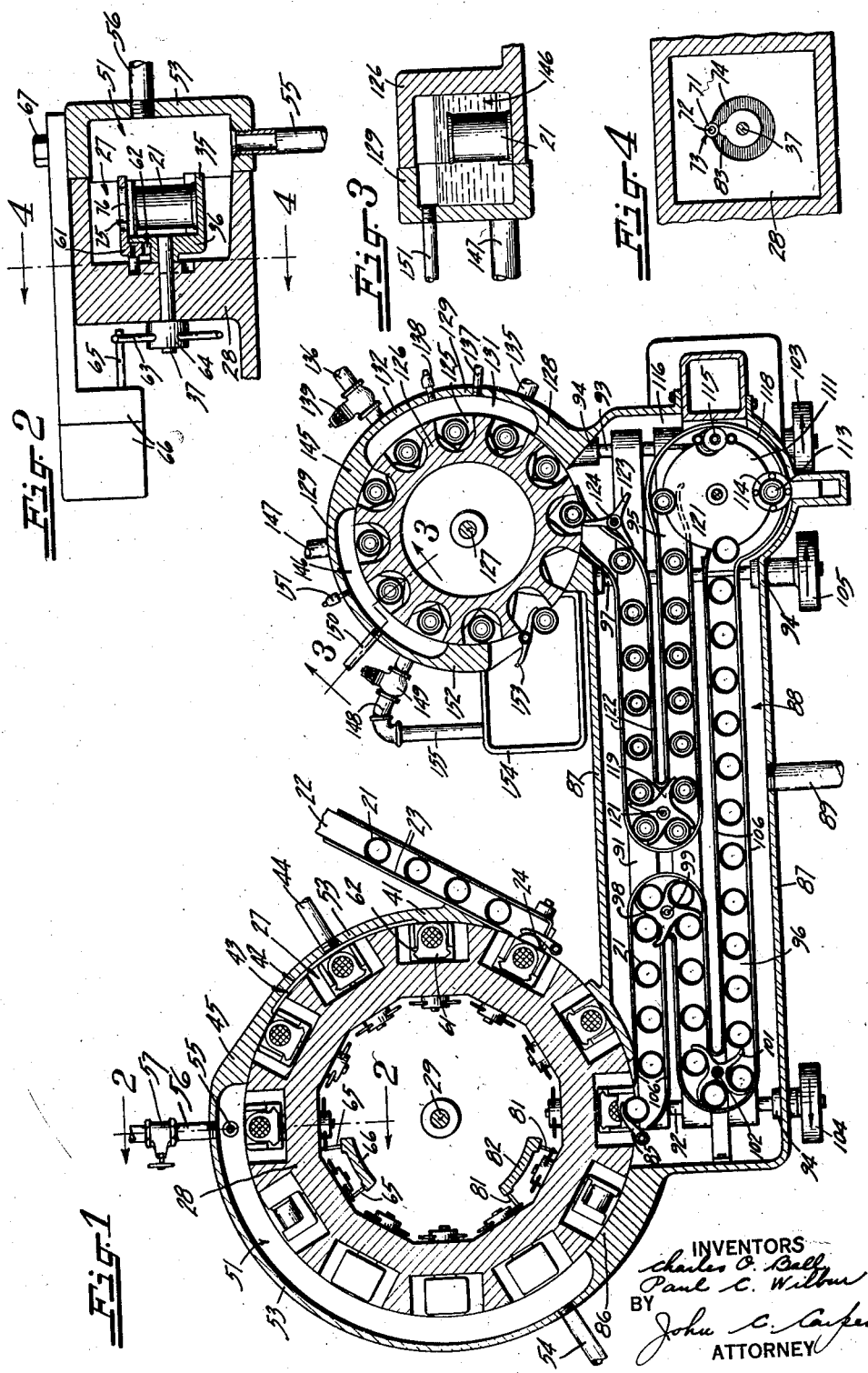

Patented May 12, 1936

2,040,726

UNITED STATES PATENT OFFICE 2,040,726

METHOD AND APPARATUS FOR CANNING

Charles O. Ball, River Forest, and Paul C. Wilbur, Oak Park, Ill., assignors to American Can Company, New York, N. Y., a corporation of New Jersey Application August 16, 1932, Serial No. 629,044

11 Claims. (Cl. 99—186)

The present invention relates in general to an improved method of canning and to apparatus usable in its practice. The invention has particular reference to the sterilization of solid food products by means of steam, and the sealing of such products in hermetically closed cans; and has for its object generally the provision of a method adapted for the canning of food products (such as vegetables), which will permit of the production of a final sterilized food product of superior quality within a shorter period of treatment than has heretofore been generally possible.

In accordance with the instant invention the raw product is placed in the can without liquor or brine bath and the can with its content is subjected to direct contact with live steam to effect the complete sterilization.

Heretofore when the filled can was first introduced into the highly heated steam atmosphere it and the contained product were relatively cool and considerable condensation of the steam resulted, which was in amount sufficient to provide water within the bottom of the can of appreciable depth.

The sterilization of the food particles by the live steam is extremely rapid and the water thus condensed in the bottom of the can precludes direct contact with the particles of food which are submerged, and acts as an insulation so that such particles are incompletely sterilized.

This invention has for its principal object the provision of a process of sterilizing food products with a highly heated steam, in such a manner that the entire content of the can will be exposed fully and in like amount to direct steam contact throughout a part of the processing operation.

The invention contemplates the introduction of the can with its contained, relatively dry, food product directly into a steam chamber and as condensation occurs or just after it has occurred inside the can, the condensate is drained to prevent submersion of a portion of the pack.

In accordance with the invention the can is inverted or at least tilted to a degree which will permit water (condensate) to run from its open mouth, this being shortly after the can is introduced into the steam bath. After the sterilization has been partially completed and while the can content is still subjected to a sterile atmosphere of steam, the can is hermetically sealed. Sterilization temperature within the can is preferably maintained for a time by leaving the can in the sterilizing steam chamber until the food product is completely sterilized and until the interior surfaces of the sealed can are also completely sterilized. After cooling of the can a high vacuum is provided therein through the condensation of the then contained steam. The amount of steam contained within the can is insufficient to produce an appreciable liquid content or a sufficient liquid content to leach off the flavors of the product or its valuable food component constituents and is just enough to impart a fresh and slightly moist condition to the product which is highly desirable.

A further object of the invention is the cooling of a product, sterilized in highly heated steam, without resulting undue strains upon the can.

The highly heated live steam atmosphere through which the can is passed for the sterilization of its contents necessitates high pressure, which, of course, is equal within and without the can before it is hermetically sealed. It may be desirable to effect further sterilizing of the sealed can and provision is accordingly made for keeping the sealed can under a steam pressure and temperature. In this way the pressure within and without the sealed can may be maintained equal until the sealed can is being cooled and the pressure inside is reduced by the lowering of the temperature and the accompanying condensation of the steam. The invention contemplates in this regard progressive cooling of the can under diminishing pressures, the diminution of such pressure generally corresponding to the diminution of the pressure within the can in the cooling.

The invention has for a further important object the provision of simple and adequate apparatus for practicing the process above described.

The invention has for a further object the provision of an apparatus for practicing such process, which may be operated continuously and which will require minimum of attention in its operation.

Numerous other objects and advantages of the invention will be apparent as it is better understood from the following description, which, taken in connection with the accompanying drawing, discloses a preferred embodiment thereof.

Referring to the drawing:—

Figure 1 is a schematic view illustrating the series of inter-connected mechanisms for performing the various steps of the present invention and illustrating sufficient of the apparatus to carry out these method steps;

Fig. 2 is an enlarged sectional detail taken substantially along the line 2—2 in Fig. 1;

Fig. 3 is an enlarged sectional detail taken substantially along the broken line 3—3 in Fig. 1; and Fig. 4 is a sectional view taken substantially along the line 4—4 in Fig. 2.

The invention contemplates the passage of an open top can filled with suitable material, such as a food product, into a can conveying turret or valve having a series of can pockets. The can, as it is positioned within one of the pockets, is brought into a can supporting cradle. This conveyor valve carries it into a preliminary sterilizing steam chamber where the sterilization of the enclosed food product begins.

With some food products it will be desirable to first vacuumize the can and product. While natural vacuumization will result from the cooling of a sealed can containing a product sterilized and sealed in a steam atmosphere, vacuumization by mechanical means before introducing the can into the steam chamber will be conducive to a saving of sterilizing time and is therefore usually desirable. Provision for vacuumizing is accordingly made in the apparatus shown.

The conveyor valve according to this embodiment first carries the can through a sealed vacuumizing chamber which removes the air from the can and in part at least from its product. The valve pocket containing the can is then cut off from the vacuum chamber and is brought into communication with the preliminary steam chamber previously mentioned.

While in this chamber a screen head or similar device is brought down upon the can as it rests within its cradle, being still carried around by the valve. The can and product are heated by the steam within the sealed steam chamber. At about the same time the cradle is moved to invert the can and the screen of the head then holds the product in the can. This inversion of the can might, of course, be effected immediately upon the can entering the steam chamber or even while the can is moving through the vacuum chamber.

The can and its product when brought into the chamber are relatively cold, being substantially at room temperature, and the high temperature of the steam within the chamber and within the can causes a certain amount of condensation on the surfaces of the food particles and on the inner surfaces of the can.

This steam condensate is drained from the can by the inverting action of the supporting cradle, while the live steam within the chamber continues to rapidly raise the temperature of can and product. Immediately removing the steam condensate prevents it from blocking the effective action of the steam against the surfaces of the product and a more uniform heat penetration of the product results.

As the can within its valve pocket approaches the end of its period of movement with the conveyor valve, its cradle is again actuated to bring the can to an upright position, this action at the same time lifting the screen head from the can. A revolving finger thereupon engages behind the can and slides it radially of the valve and out of the pocket.

While the sterilizing chamber through which the can has just passed may be extended and the can continue in that chamber, it is sometimes desirable to bring the now heated can and contents into a different chamber also maintained under sterilizing temperature by steam. Accordingly there is disclosed a separate steam chamber not in direct communication with the preliminary chamber. This being distinct from the former chamber, may be at a different temperature and pressure if desired.

The can leaving the valve pocket now enters the second sterilizing chamber. The revolving finger sweeping it from the valve places it upon a horizontal belt conveyor, which carries it only a short distance. It is then transferred onto an adjacent intermediate belt by means of a starwheel, the latter belt moving in the opposite direction. At the end of the intermediate belt opposite its place of entrance into the chamber the can is engaged by a second starwheel which transfers it onto a third belt conveyor also operating alongside of and parallel to the other conveyor belts.

In this manner each can traverses a sinuous path, all of the time being subjected to the sterilizing action of the steam within the closed chamber. The sterilization is remarkably rapid depending upon the particular product. The can now enters into a suitable double seaming machine.

Parts of the seaming machine are also within the steam chamber. A can cover is automatically positioned on each can and is preferably double seamed to the can to fully seal the product therein. Any suitable form of sealing machine may be used providing it is capable of operation under the pressure and heat of the steam chamber. Introduction of the can cover into the steam chamber in any suitable manner effects its sterilization.

Sterilization of the product may be completed at the time of closing of the can in which event the can would be immediately removed from the sterilizing chamber and cooled. Some products, however, require a continuation of the sterilizing time and provision is made to effect this. The sealed can is now discharged on to the intermediate conveyor belt which carries it to a position of transfer where a star wheel transfers it to another one of the conveyor belts. In this way the can is retained in the sterilizing chamber after sealing and sterilization continues as long as it is in the chamber during this phase of sterilizing time all interior surfaces of the sealed can are also completely sterilized.

From the conveyor belt the can is now transferred by a starwheel into a pocket of a continuously moving discharge valve. This valve carries the can through one or more cooling operations, the cooling being carried on in steps when a plurality of cooling operations are used. The drawing shows two sealed chambers and an open air water tank for this purpose.

The can is first passed into and through a primary cooling chamber wherein it is caused to move through a water bath. The water immerses the can, partially filling the valve pocket. The water effects a degree of cooling of the can contents and the water bath is held under a given air pressure to prevent straining of the can seams.

In other words, there is maintained a partial balancing pressure on the outside of the can to offset the interior can pressure caused by the steam enclosed heated product. It will be recalled that this product was closed in an atmosphere of steam and therefore both pressure and heat are present in the can. This interior pressure diminishes as the temperature of the product is reduced.

The sealed can is then subjected to a second cooling chamber of like construction where it is carried through a second bath. The water in the second bath is also held under a given air pressure, this being less than the pressure in the preceding chamber to more nearly balance the reduced interior can pressure of the partially cooled product.

Continual movement of the valve carries the can out of the second cooling bath and discharges it into the atmosphere, the can dropping into an open water bath. A rotating finger passing within the valve pocket assists in this discharge.

The sealed can is in this way caused to give up its heat gradually so that the steam pressure existing within the can during its sealing under the steam atmosphere is dissipated by the time the can is brought out into the open. This balancing of the internal pressure within the can by the external pressure upon the outside may be so adjusted that the pressure differences will not exceed five or possibly at most ten pounds per square inch. Such a pressure does not strain the can seams and deformation or impairment of the can cannot take place.

For the purpose of more clearly illustrating the various steps of the present invention the drawing shows sufficient of the principal parts of a mechanism or more properly a series of mechanisms for treating a product so that a fully sterilized and sealed can or product results. The product, filled within its open top can 21, is or may be first brought into the apparatus upon an endless belt conveyor 22 and guided in its passage between guide rails 23.

Adjacent one end of travel of the conveyor 22, each can is progressively engaged by a reciprocating finger 24 and swept from the belt and into a pocket 27 of a rotary conveyor turret or valve 28 which moves upon a vertical axis 29.

The can 21, entering the pocket 27, moves upon a supporting shelf 35 (Fig. 2) of a can holding cradle 36 which is carried upon a horizontal shaft 37 journaled for step rotation or reciprocation within the valve member 28. Such a cradle 36 is located within each valve pocket 27 and the can moves upon the shelf 35 without any interruption of rotation of the valve 28.

The valve member is suitably enclosed within a valve frame or casing 41 and each pocket 27, containing a suitably positioned can, passes from its can receiving position and is then cut off from the outside atmosphere by a wall of the frame.

This casing wall is relieved at 42 to provide a vacuum chamber 43 from which air is continuously removed through a suction pipe 44 which may communicate with any suitable vacuum source. During the travel of the turret pocket 27, in communication with the chamber 43, air is extracted from the pocket and from the interior of the can. The pocket in passing beyond the vacuum chamber 43 engages a cylindrical wall section 45 of the frame casing 41 which cuts it out of communication with the vacuum influence.

Where the vacuumizing step is eliminated it is only necessary to dispense with the removal of the air through the pipe 44. Passage of the cans through this section of the machine under those conditions is therefore without effect upon the moving can or product.

The pocket 27 with its contained can passes beyond the wall 45 and comes into communication with a preliminary sterilizing steam chamber 51 which is contained within a relieved part of a cylindrical wall 53 of the frame 41. This chamber 51 encloses and is open to substantially 180° of the valve member 28 and a number of pockets 27 are in communication with the chamber at all times. This steam chamber is supplied with live steam in any suitable manner as through a service pipe 54. A drain pipe 55 (Fig. 2) may be used to draw off any condensate from the chamber. A steam trap of any suitable construction (not shown) may be attached to the drain pipe 55.

In case the vacuumizing step is eliminated and the removal of the air from the chamber 43 through the pipe 44 is dispensed with, sufficient air would be carried into the steam chamber 51 by the pockets 27 to interfere with the proper sterilization. In order to remove this objectionable air an air escape pipe 56 and an air and steam control valve 57 are provided.

As soon as a can pocket 27 comes into communication with the steam chamber 51, the temperature of the can and its product begins to rise. Immediately following, the can is turned from its upright position within the valve pocket. To permit this action provision is made for clamping the can to its seat. A screen head 61 is mounted for slight movement within a groove 62 of the cradle 36. This head is brought down upon the can 21, simultaneously with the initial inverting movement of the cradle.

This movement of the head 61 and the corresponding movement of the cradle takes place as the cradle shaft 37 moves. Rotation of the shaft is effected by a plurality of radial arms 63 carried by a collar 64 which is secured to the end of the shaft 37 inside of the valve body 28. As an arm 63, carried around by the conveyor valve, strikes against a stationary post 65 (Figs. 1 and 2) the rotation of the shaft takes place.

The post 65 is carried by a bracket 66 bolted at 67 to the stationary frame casing 41. To effect the full desired 180° of movement of the shaft 37 to turn the can upside down, two posts 65 are used and these posts engage progressively adjacent arms 63.

As soon as the shaft 37 begins its rotation a cam roller 71, carried on a pin 72 projecting rearwardly from the head 61, is moved out of a cam pocket 73 formed in a cam groove 74 cut in the inner wall of the valve pocket 27. This cam groove forces the roller 71 downwardly and moves the head 61 nearer to the center of the shaft 37. The head 61 is formed with an opening 75 which is in alignment with the axis of the can 21 as it rests within the cradle. This opening is covered with a screen 76 and as the head moves, the screen part clamps down on the open end of the can.

When the can is in inverted position, the screen 76 supports the product and prevents it falling out of the can. Throughout and following this inverting movement the can is subjected to steam and is passing through the steam chamber 51 and all of this time the can and its product is being raised in temperature. Condensation of steam is caused by the difference in temperature between the product and can on the one hand and the temperature of the steam on the other. This condensate immediately runs out of the inverted can.

This inverted position of the can allows a more uniform heat penetration of the product and there being no liquid to act as a blanket around the product particles more uniform steam circulation results. If the can and its product contains air, as would be the case if no mechanical vacuumizing is used, the inverting of the can in addition to drainage of condensate results in the spilling out of the air which is heavier than the steam.

As the can pocket 27 under consideration nears the position of discharge the cradle 36 is moved through another 180° either by further forward rotation or by reverse rotation of the cradle and is brought back to its original position with the can upright upon its shelf 35. To effect this return movement of the cradle other arms 63 progressively engage posts 81 carried by a bracket 82 also supported by the stationary frame 41.

When the cradle approaches the end of its rotation for this return or uprighting movement, the cam roller 71 engages a projection 83 (Fig. 4) formed in the wall of the valve pocket which forces the roller again into the cam pocket 73 and moves the head 61 away from the open end of the can. This disengages or unclamps the can.

The pocket 27 containing the drained and righted can now passes into position where an arm 85 (Fig. 1) moves into the pocket and engages behind the can. Movement of the arm sweeps the can from the valve pocket. During this last part of the movement of the turret valve 28 its pocket passes a wall 86 formed in the frame casing and is cut off from the steam chamber 51.

The frame casing 41 from one side of the cylindrical wall 53 spreads out into a rectangular section 87 which encloses a second sterilizing steam chamber 88. This chamber may be under the same steam pressure as that in chamber 51 or it may be at a greater or lesser degree as desired. A suitable steam pipe 89 may connect with this chamber to keep a supply of live steam under proper temperature and pressure. It is in the chamber 88 that the can 21 completes its sterilization.

The arm 85 in sweeping the can from the valve pocket 27 places it upon a horizontal conveyor belt 91 disposed between supporting pulleys carried upon horizontal shafts 92, 93, journaled in suitable bearings 94 formed in the opposite walls of the frame section 87. One of these pulleys is fixed to its shaft as a drive pulley while the opposite pulley turns idly upon its shaft.

There are disclosed in the drawing three parallel endless belt conveyors which are used to carry the can over an extended path while it is in the sterilizing chamber. The length of such a path will largely determine the sterilizing time for the product while in the chamber 88. An intermediate conveyor 95 is disposed alongside of the conveyor 91 and an outside conveyor 96 is located adjacent the conveyor 95. The conveyor belts 95, 96 are similarly driven by or supported upon drive and idler pulleys associated with the shafts 92, 93 and with a third horizontal shaft 97 also journaled in suitable bearings 94 formed in the frame section 87.

The can 21 is moved a short distance toward the right (Fig. 1) by the belt 91 and is then shifted to the intermediate belt 95 which carries it back toward the left. At the point of transfer a starwheel 98 mounted on a vertical shaft 99 effects the transfer from belt to belt. In a similar manner the can is again shifted, this time from the intermediate belt 95 to the belt 96 which then carries it again toward the right for substantially the length of the chamber. A starwheel 101 mounted upon a vertical shaft 102 effects this later transfer.

To effect the proper direction of belt travel the drive pulley for the belt 91 is preferably keyed to and carried by the shaft 93 which is rotated in any suitable manner as by connection with a drive pulley 103 secured to the shaft and moving in the direction of the arrow. In a similar manner the drive pulley for the belt 95 is secured to the shaft 92 which is rotated in any suitable manner as by application to a belt pulley 104 carried by this shaft and driven in the opposite direction. The belt 96 is driven through a drive pulley secured to the shaft 97 which may receive rotative power through a belt pulley 105 secured to the shaft and driven in the direction of the arrow. The pulleys which carry the belts at the ends opposite their drive pulleys turn idly on their supporting shafts. A system of guide rails 106 is suitably arranged on opposite sides of the belts to direct the can 21 in its sinuous line of travel.

The belt 96 carries the can into a pocket of a turret 111 which may be a part of a suitable seaming machine. Can covers 113 are preferably contained within a magazine 114 associated with the seaming machine and a can cover is positioned upon each can as it is carried by the turret 111 into position for seaming within a seaming head 115. This head secures the can end to the can and hermetically seals it, this action taking place while the can is still in an atmosphere of steam.

The seaming mechanism and associated parts are preferably contained within a section 116 forming one end of the sterilizing chamber 88. This sealing section may be referred to as a sealing chamber which in the present disclosure is at all times open to the sterilizing chamber 88. A curved guide rail 118, which may be an extension of one of the rails 106, cooperates with the turret 111 and causes the can to traverse the proper path of travel for the seaming operation.

If no further sterilization of the product is needed after the can is sealed it may be removed at once from the sterilizing chamber 88 and passed through the cooling operations. If it is desirable, however, for the sealed can to be further maintained at its high sterilizing temperature it will not be immediately removed from its steam atmosphere. To carry out such further sterilization the can is carried along a further path of travel while it is still within the sterilizing chamber.

In such a case, the sealed can 21 is positioned by the turret 111 directly on the intermediate conveyor belt 95 which moves it toward the left (Fig. 1). A starwheel 119 mounted on a vertical shaft 121 next engages the can and shifts it from the belt 95 back onto the belt 91 which again carries it toward the right. These belt and transfer members thus provide a further sinuous path of travel for the can and a system of guide rails 122 located in pairs along the edges of the belts 91, 95 directs it in its proper path.

A three-point starwheel 123 mounted upon a rotating vertical shaft 124 now engages the can 21 and sweeps it from the belt 91 and carries it along inclined extensions of the guide rails 122 positioning it into a pocket 125 of a continuously rotating cooling conveyor or valve 126 rotating on a vertical axis 127. After a can has been fully inserted within a pocket 125 of the valve 126, the pocket passes a cylindrical wall 128 formed in an enclosing frame housing 129 of the cooling mechanism.

This wall 128 cuts off the pocket and its contained can from the steam chamber and separates the steam chamber from a cooling chamber 131 formed in part within a recess 132 in the valve housing 129. The can, while passing chamber 131, may be cooled in any suitable manner, the drawing illustrating a chamber adapted for the reception of a bath of cooling water which may be introduced through a pipe 135. A circulation of water is maintained, an exit pipe 136 cooperating with the pipe 135 being used for this purpose.

It is desirable that the cooling bath be held under a pressure above atmosphere, the proper degree of pressure bearing a direct relation to the internal pressure which may exist in the can by reason of its heated contents. Such a water pressure may be obtained by filling the head space above the water bath with air under compression as by an inlet pipe 137.

A blow-off valve 138, associated with the air chamber and located above the water level in the bath, is effective in maintaining the pressure constant. A regulating valve 139 is disposed in the exit pipe 136 to insure the proper circulation of water in the bath.

A plurality of cooling steps are contemplated and have been found desirable, this giving a better balance of external pressure on the can wall to reduce the difference in pressures outside and inside of the cans. The cooling chamber 131 may be substantially duplicated to obtain a step cooling.

For such an arrangement the cans in the valve pocket 125 after passing through the chamber 131 are further carried through other cooling units. A wall 145 is formed in the chamber housing 129 at the end of the chamber 131 and as the can in its valve pocket is moved adjacent this wall, connection with the cooling chamber 131 is cut off.

The can, after passing by the wall 145, is carried into a second cooling chamber 146. This chamber is also partially filled with water (see Fig. 3). Air pressure is again used upon the water to impart a pressure in the bath. Such a pressure is less than the pressure in the first bath to more nearly correspond with the reduced pressure now existing within the interior of the can by reason of the can contents having been partially cooled in the first bath.

The bath in chamber 146 may be supplied with water from a pipe 147 and the water discharged through a pipe 148, a regulator valve 149, disposed within the exit pipe line, regulating the water circulation within the cooling chamber. The compressed air for the head space in the chamber 146 may be introduced through a pipe 150, a blow-off valve 151 being used to maintain a uniform degree of pressure.

After passing the end of the cooling chamber 146 formed in the housing 129, a wall 152 cuts off the pocket from communication with the bath. The valve pocket 125 now moves into a position where discharge of the can is effected. Rotating discharge fingers 153 are mounted adjacent the outer wall of the rotating valve 126 and as a pocket 125 moves adjacent, one of the fingers engages behind the can in the pocket and sweeps it from the valve.

The can falls into a final cooling tank 154 which is open to atmosphere and which is supplied with water through a pipe 155 connected with the discharge pipe 148. By the time the can reaches this position of discharge the contents of the can are comparatively cool and its internal pressure has been reduced a sufficient amount to prevent straining of the can seams.

The outside cooling tank 154 may be entirely eliminated provided the cooling time in the several cooling chambers is correspondingly extended and the pressure variations properly regulated.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

We claim:

1. An apparatus for canning non-liquid products, which comprises separate sealed vacuum steam and water chambers, an inlet conveyor valve having can receiving pockets and adapted to receive open top cans containing a solid product and adapted to pass them through said vacuum chamber where they are vacuumized and into said steam chamber where the product is sterilized, a can holding cradle located in each valve pocket for holding the can while in said valve, and means for shifting said cradle and inverting the said held can while the latter is in said steam chamber for draining the resulting condensate caused by the temperature differences between the steam and the can and its product.

2. An apparatus for canning non-liquid products, which comprises separate sealed vacuum steam and water chambers, an inlet conveyor valve having can receiving pockets adapted to receive open top cans containing a solid product and adapted to pass them through said vacuum chamber for vacuumizing and into said steam chamber for sterilizing, a can holding cradle located in each valve pocket for holding the can while in said valve, means for shifting the said cradle and inverting a said held can while the latter is in said steam chamber for draining the resulting condensate caused by the temperature differences between the steam and the can and its product, and a screen device associated with each can cradle for assisting in such drainage while retaining the product within its can.

3. The method of canning, which comprises passing open top cans, containing a product consisting of separate particles without free liquid, through a sealed enclosed sterilizing chamber while subjecting them to steam of high temperature and pressure to impart a sterilizing temperature to the particles of said product, inverting said cans while still in said sterilizing chamber and simultaneously holding and maintaining the product within the inverted can to permit passage of the steam through the interstices of the product and to insure direct and rapid unrestricted contact of the steam with the said product particles, and to drain the resulting condensate from the cans, and sealing said cans while still subjected to the steam of high temperature and pressure.

4. The method of canning, which comprises passing open top cans containing a product, consisting of separate particles exclusive of free liquid, through a sealed enclosed chamber and while in said chamber vacuumizing said cans, passing said vacuumized cans through a sealed sterilizing chamber while subjecting the particles of the product in the can to steam of high pressure and temperature to rapidly impart a sterilizing temperature to the said particles by direct and unrestricted contact of the steam therewith, draining the resulting condensate from the cans and their product while still in said sterilizing chamber while maintaining the distinct and separate characteristics of the product, passing said cans into a seaming mechanism and sealing them in a steam atmosphere of high pressure and temperature, further subjecting said sealed cans to steam of high pressure and temperature to rapidly complete the sterilization of said product particles, and passing said sealed cans through a sealed cooling chamber.

5. The method of canning, which comprises passing open top cans containing a product, which consists of discrete particles only, through a sealed and enclosed sterilizing chamber, while subjecting them to live steam, which circulates through the interstices of the product and directly contacts the said particles to rapidly impart the sterilizing temperature to the product, inverting said cans and draining the resulting condensate from the cans and their product while still in said sterilizing chamber, said inverted position more definitely insuring the direct engagement of the steam with the particles, passing said cans into a seaming mechanism and sealing them while still heated, further subjecting said sealed cans to live steam to rapidly complete the sterilization of the product and cooling said sealed cans by passing them through a plurality of enclosed sealed cooling chambers.

6. The method of canning, which comprises passing open top cans containing only a discrete product in the absence of free liquid through a sealed chamber and while in said chamber vacuumizing said cans, passing said vacuumized cans through an enclosed sterilizing chamber while subjecting the particles of the product to a circulation of live steam at high pressure and heat to rapidly impart a sterilizing temperature to the said particles, draining the resulting condensate from the cans and their product while still in said sterilizing chamber, the while holding the separate particles of the product within the cans and in direct contact with the steam, passing said cans into a seaming mechanism and sealing them while still under a steam atmosphere, subjecting the sealed cans to steam at high pressure and heat to rapidly complete sterilization of the product and cooling said sealed cans by passing them successively through a plurality of sealed and enclosed water chambers maintained at decreasing pressures.

7. The method of canning food products, which comprises passing open top cans containing a food product, which consists of discrete particles without free liquid, through a sealed vacuum chamber and vacuumizing said cans and their product, passing said vacuumized cans through an enclosed and sealed sterilizing chamber while subjecting the individual particles of the product to direct contact with steam of high temperature and pressure, inverting said cans during their passage in said steam chamber to drain off the resulting condensate while retaining the product within the can and while maintaining the product free from liquid, passing said cans into a sealing chamber while subjecting them to steam, sealing said product within said cans while in said sealing chamber, and subjecting said sealed cans to steam the while passing them through a sterilizing chamber to rapidly sterilize the said discrete particles of food product and also to rapidly sterilize all interior surfaces of said sealed cans.

8. The method of canning food products, which comprises passing open top cans containing food products consisting of solid particles only through an enclosed and sealed sterilizing chamber while subjecting them to direct contact with steam to rapidly impart a sterilizing temperature thereto, inverting said cans during their passage in said steam chamber to drain off the resulting condensate while retaining the product within the can, righting said can into upright position while still in said sterilizing chamber, and maintaining said product relatively free of liquid, passing said upright cans into a second sterilizing chamber while subjecting them to steam, sealing said product within said cans while still subjected to steam, and further subjecting said sealed cans to steam within said sterilizing chamber to complete sterilization of the product and to also sterilize all interior surfaces of the can.

9. The method of canning food products, which comprises passing open top cans containing food products of a separate particle nature without free liquid through an enclosed and sealed sterilizing chamber while subjecting them to steam, and while circulating the steam through the interstices of the product, inverting said cans during their passage in said steam chamber and during the circulation of the steam through the interstices of the product to drain off the resulting condensate while retaining the product within the cans and to accelerate the rapid heating of the product to a sterilizing temperature, righting said cans into upright position, sealing said product within said cans in an atmosphere of steam at sterilizing temperature, subjecting said sealed cans to steam at a sterilizing temperature to rapidly complete the sterilization of the food product and to also rapidly sterilize all interior surfaces of the sealed cans.

10. An apparatus for canning, which comprises a sealed vacuum chamber, an enclosed sealed steam sterilizing chamber, a sealed water cooling chamber, conveyor means for passing filled cans through said chambers, means operating within said steam chamber and carried by a said conveyor means for inverting and draining said cans of steam condensate while in said steam chamber, a seaming mechanism also operating within said steam chamber for sealing said cans, and means for maintaining air pressure above the surface of the water in said cooling chamber so that the heated can contents will be cooled without straining of the seams of the can.

11. The method of canning food products, which comprises passing open top cans containing food products of a separate particle nature without free liquid through an enclosed and sealed sterilizing chamber while subjecting them to contact with live steam, while circulating the steam through the interstices of the product, inverting said cans during the passage in said steam chamber and during the circulation of the steam through the interstices of the product, to drain off the resulting condensate while retaining the product within the cans, said steam circulation serving to rapidly impart a sterilizing temperature to the product, passing the cans into a sealing chamber which is maintained at sterilizing temperature by confined steam, sealing said product within said cans while in said sealing chamber, returning the sealed cans into said sterilizing chamber and further subjecting them to steam at a sterilizing temperature to rapidly complete the sterilization of the product and to rapidly sterilize all interior surfaces of the cans, and cooling the cans in a sealed cooling chamber to reduce their internal pressure before bringing them out into the atmosphere.

CHARLES O. BALL.
PAUL C. WILBUR.